US007344175B2

(12) United States Patent
Mieger et al.

(10) Patent No.: US 7,344,175 B2
(45) Date of Patent: Mar. 18, 2008

(54) GRABBING TOOL

(75) Inventors: Rolf Mieger, Kirchdorf (DE); Dirk Asam, Ulm (DE); Bernd Wager, Kirchdorf (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 0 days.

(21) Appl. No.: 11/077,848

(22) Filed: Mar. 11, 2005

(65) Prior Publication Data

US 2005/0200146 A1 Sep. 15, 2005

(30) Foreign Application Priority Data

Mar. 12, 2004 (DE) .................. 20 2004 003910 U

(51) Int. Cl.
*B25J 15/00* (2006.01)

(52) U.S. Cl. ........................................ 294/106; 37/444

(58) Field of Classification Search ................ 294/106; D15/32; 37/403, 406, 444, 452, 903
See application file for complete search history.

(56) References Cited

U.S. PATENT DOCUMENTS

| | | | | |
|---|---|---|---|---|
| 4,907,356 | A * | 3/1990 | Labounty | 37/406 |
| 6,000,108 | A * | 12/1999 | Roan | 24/600.9 |
| 2003/0066215 | A1* | 4/2003 | Grant | 37/446 |
| 2005/0097789 | A1* | 5/2005 | Asam et al. | 37/403 |

FOREIGN PATENT DOCUMENTS

| | | |
|---|---|---|
| DE | 1756642 | 5/1970 |
| DE | 8815474 | 5/1989 |
| DE | 3841940 | 5/1990 |
| DE | 9102928 | 5/1991 |

* cited by examiner

*Primary Examiner*—Saul Rodriguez
*Assistant Examiner*—Paul T Chin
(74) *Attorney, Agent, or Firm*—Dilworth & Barrsese LLP

(57) ABSTRACT

A multi-scoop grab, having at least one grab scoop (10) with at least one prong, wherein at least one wear element (16, 18, 20) is arranged at the at least one grab scoop (10) such that the main wear regions are covered by the at least one wear element (16, 18, 20) (FIG. 1 ).

23 Claims, 1 Drawing Sheet

GRABBING TOOL

The invention relates to a grabbing tool, preferably to a multi-scoop grab, having at least one prong.

BACKGROUND OF THE INVENTION

Multi-scoop grabs for material transfer serve in particular the loading of bulk material, fine and coarse scrap and demolition waste or also for the loading of VA steels. These materials are abrasive materials which often have a substantially higher hardness than the picking-up tool or the grab. A substantial material removal thereby takes place at the grab scoops after a relatively short time. For construction reasons, in particular due to the required toughness, the grab scoops are made from a material which is not so resistant so that the wear is very high overall.

To increase the service life of the grab scoops, the grab scoops are currently regenerated by so-called armor plating using an electrode. This build-up welding is very time-consuming and it is necessary to dismantle the total grab scoop for this regeneration of the grab scoops.

SUMMARY OF THE INVENTION

It is the object of the invention to extend the durability of the grab tools and to simplify the regeneration of the grab tools which may become necessary and so to lower the regeneration costs.

This object is solved in accordance with the invention by the combination of the features herein. Accordingly, a grab tool, preferably a multi-scoop grab, is provided which has at least one grab scoop having at least one prong, with at least one wear element being arranged at the at least one grab scoop such that the main wear regions are covered by the at least one wear element.

The regions mainly attacked by the abrasive materials are hereby effectively protected. After corresponding wear of the additionally provided wear elements, they can be replaced in a simple manner.

Particular aspects of the invention result from the dependent claims following on from the main claim. Accordingly, the at least one wear element can consist of wear-resistant material. This wear-resistant material can be a highly wear-resistant material which is not weldable as such, on the one hand, or can also be a highly treated material which is still just weldable.

The at least one wear element can advantageously be releasably connected to the grab scoop via bolts and/or screws. A particularly simple replacement of the wear element is hereby possible.

Alternatively, the wear element can be connected to the grab scoop via an adhesive connection. In this case, a highly wear-resistant material which is not weldable per se can be connected to the grab scoop. This is naturally also possible for the aforesaid case of the bolt and/or screw connection.

Within the framework of the invention, the wear element can also consist of highly treated material which, while being very resistant, is, however, still weldable. This wear element can be connected to the grab scoop via tack welding.

In accordance with an advantageous embodiment of the invention, the wear element can be made as a cast part or as a forged part.

Finally, the wear elements can each be designed as segments of a circle, with the advantage resulting there that the individual segments of a circle can be replaced individually depending on the wear.

BRIEF DESCRIPTION OF THE DRAWINGS

Further details and advantages of the invention will result from an embodiment shown in the drawing.

There are shown.

DESCRIPTION OF THE PREFERRED EMBODIMENTS

Figure 1:
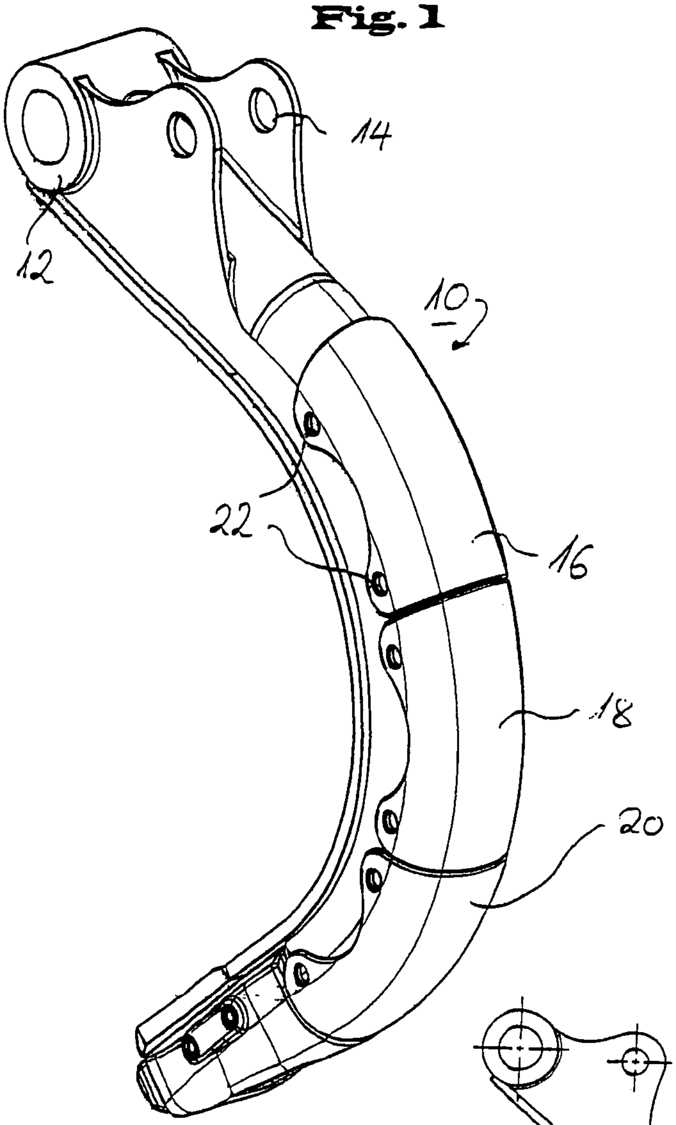
FIG. 1: a grab scoop of a grab tool in accordance with the invention in a perspective view.
Figure 2:
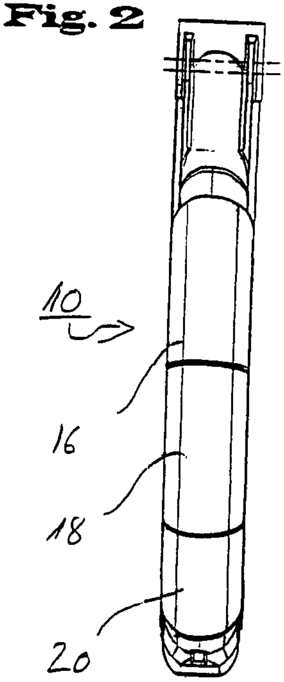
FIG. 2: the grab tool of FIG. 1 in a frontal view.
Figure 3:
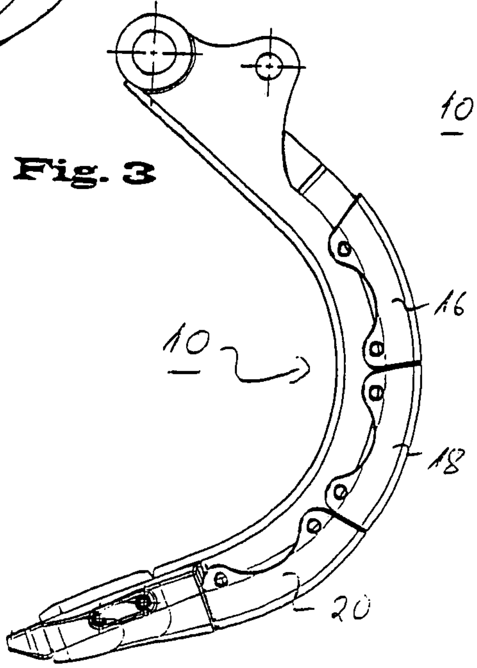
FIG. 3: the grab tool of FIG. 1 in a side view.
Figure 4:
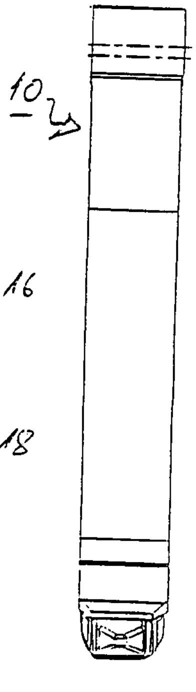
FIG. 4: the grab tool in accordance with FIG. 1 in a rear view.

A single grab scoop 10 of a grab tool in accordance with the invention consisting of one prong is shown in FIG. 1. The grab scoop 10 is made in curved form, as in FIG. 1. The grab scoop 10 has support points 12 and 14 in a customary manner. The grab scoops 10 are generally made from a tough, but not very resistant material. To protect the grab scoops 10 against abrasion by the material to be grabbed in particular in the outer region, three wear parts 16, 18 and 20 have been placed onto the grab scoop 10 in the embodiment variant shown here such that the main wear regions are protectively covered by these wear elements 16, 18 and 20. In the embodiment shown here, the wear elements 18, 18 and 20 are made as cast parts, with all three parts being designed in the form of segments of a circle.

At the side, the wear elements, which surround the outer circumference of the prong of the grab scoop 10, have bores 22 through which securing screws, which are not represented in any more detail here, can be inserted and can be screwed to the grab scoop 10. A segment-shaped wear element 16, 18 or 20 can thus be directly replaced on corresponding wear by a simple release of four screws without the grab scoop 10 having to be dismantled. A particular advantage of this simple replacement of the wear element by a mechanical connection with respect to regeneration by deposition also consists of the fact that the risk of contraction strain associated with regeneration welding, which represents a reduction in strength, can be reliably avoided here.

The invention claimed is:

1. A grab tool, in particular a multi-scoop grab, comprising at least one grab scoop in the shape of a crescent having an inner curved surface, an outer curved surface, and at least one prong positioned at an outer end thereof, said scoop structured and arranged to contact, scoop and grab material with said inner curved surface situated above said outer curved surface, a plurality of curved wear elements structured and arranged to mate with and be removably mounted upon the outer curved surface of the at least one grab scoop in a line along a direction from said at least one prong to an opposite inner end of said scoop and a direction of scooping the material, said wear elements being linearly arranged on each grab scoop in an end to end orientation, and said wear elements each wrap around at least portions of lateral sides of said scoop between said inner and outer curved surfaces, and each wear element having at least two bores on each of two lateral sides, each bore for receiving a respective fastening member for attachment to the grab scoop.

such that main wear regions along the outer curved surface are covered by the wear elements.

2. A grab tool in accordance with claim 1, wherein the wear elements are formed of wear-resistant material.

3. A grab tool in accordance with claim 2, wherein the wear elements of highly wear-resistant material are releasably connected to the grab scoop via bolts or screws.

4. A grab tool in accordance with claim 3, wherein the wear elements are made as a cast part or as a forged part.

5. A grab tool in accordance with claim 2, wherein the wear elements of highly wear-resistant material are connected to the grab scoop via an adhesive connection.

6. A grab tool in accordance with claim 5, wherein the wear elements are made as a cast part or as a forged part.

7. A grab tool in accordance with claim 6, wherein the wear elements are designed as segments of a circle.

8. A grab tool in accordance with claim 2, wherein the wear elements of highly treated material are releasably connected to the grab scoop via tack welding.

9. A grab tool in accordance with claim 8, wherein the wear elements are made as a cast part or as a forged part.

10. A grab tool in accordance with claim 2, wherein the wear elements are made as a cast part or as a forged part.

11. A grab tool in accordance with claim 2, wherein the wear elements are designed as segments of a circle.

12. A grab tool in accordance with claim 1, wherein the wear element of highly wear-resistant material are releasably connected to the grab scoop via bolts or screws.

13. A grab tool in accordance with claim 12, wherein the wear elements are made as a cast part or as a forged part.

14. A grab tool in accordance with claim 12, wherein the wear elements are designed as segments of a circle.

15. A grab tool in accordance with claim 1, wherein the wear elements of highly wear-resistant material are connected to the grab scoop via an adhesive connection.

16. A grab tool in accordance with claim 15, wherein the wear elements are made as a cast part or as a forged part.

17. A grab tool in accordance with claim 1, wherein the wear elements of highly treated material are releasably connected to the grab scoop via tack welding.

18. A grab tool in accordance with claim 17, wherein the wear elements are made as a cast part or as a forged part.

19. A grab tool in accordance with claim 1, wherein the wear elements are made as a cast part or as a forged part.

20. A grab tool in accordance with claim 1, wherein the wear elements are designed as segments of a circle.

21. A grab tool in accordance with claim 1, comprising three said wear elements removably mounted upon the outer curved surface of the grab scoop.

22. A grab tool in accordance with claim 1, additionally comprising a pair of support points (12, 14) at an end of said grab scoop opposite said prong.

23. A grab tool in accordance with claim 1, wherein said wear elements each comprise bores on lateral sides thereof for being secured to said scoop via screws inserted through said bores and into the respective lateral sides of said scoop.

* * * * *